United States Patent [19]

Seragnoli et al.

[11] Patent Number: 4,524,785
[45] Date of Patent: Jun. 25, 1985

[54] METHOD AND APPARATUS FOR FORMING PERFORATIONS IN BAR-LIKE ARTICLES

[75] Inventors: Enzo Seragnoli; Armando Neri, both of Bologna, Italy

[73] Assignee: G.D Societa' per Azioni, Bologna, Italy

[21] Appl. No.: 477,606

[22] Filed: Mar. 22, 1983

[30] Foreign Application Priority Data

Apr. 13, 1982 [IT] Italy ................ 48221 A/82

[51] Int. Cl.³ .............................. A24C 5/60
[52] U.S. Cl. ................... 131/281; 219/121 LK; 219/121 LL; 219/121 LQ; 219/121 LR; 219/121 LS; 219/121 LT; 219/121 LU; 219/121 LV; 219/121 LY; 219/121 LZ; 219/121 LM
[58] Field of Search ............... 131/281; 219/121 LK, 219/121 LL, 121 LQ, 121 LR, 121 LS, 121 LT, 121 LU, 121 LV, 121 LY, 121 LZ, 121 LM

[56] References Cited

U.S. PATENT DOCUMENTS

| | | | |
|---|---|---|---|
| 4,224,498 | 9/1980 | Grollimund et al. | 219/121 LT |
| 4,265,254 | 5/1981 | Koch et al. | 219/121 LK |
| 4,281,670 | 8/1981 | Heitmann et al. | 131/281 |

Primary Examiner—V. Millin
Assistant Examiner—Gregory Beaucage
Attorney, Agent, or Firm—Shlesinger, Arkwright, Garvey & Fado

[57] ABSTRACT

A method and apparatus for forming perforations in articles in the form of bars, in which, during their movement through a piercing station, the articles are pierced by means of beams of laser rays emitted in a predetermined sequence by laser emitters, which can be laser generators or simple reflectors so positioned with respect to each said article to be pierced as to maintain the path length followed by the laser rays to form each perforation, once focused, constantly equal to the focal length thereof.

8 Claims, 4 Drawing Figures

METHOD AND APPARATUS FOR FORMING PERFORATIONS IN BAR-LIKE ARTICLES

BACKGROUND OF THE INVENTION

The present invention relates to a method for forming perforations in articles of bar-like form utilising laser rays. The present invention finds particularly advantageous application in the field of the production of smoking articles, in particular cigarettes, to which the following discussion will make specific reference without any loss of generality thereby.

For the purpose of avoiding any doubt about the interpretation of various terms utilised hereinafter in the following description and in the claims, it is stated that:

the term "generator" or "laser generator" will be understood to refer to an active element such as, for example, a laser gun capable of generating a beam of laser rays;

the term "reflector" or "laser reflector" will be understood to refer to a passive element capable solely of reflecting a beam of laser rays emitted by a "generator";

the term "emitter" or "laser emitter" will be understood to refer to an element which can be active or passive, that is to say an element which may be a "generator" or may be a "reflector";

the term "focusing point" will be understood to refer to the point at which the rays of a beam of parallel laser rays are deviated to converge at a point or focus;

the term "focal length" will be understood as the distance travelled by a beam of laser rays from the "focusing point" to the focus; and the term "piercing point" will be understood to refer to the point at which a hole is to be formed.

In the field of cigarette manufacture it is known to form so-called "ventilated" cigarettes, that is to say cigarettes provided in the region of the filter with a plurality of holes which permit the smoker to inhale, together with the smoke, a percentage of external air, with the double advantage of diluting the inhaled smoke and reducing its temperature and, therefore, the content of harmful elements.

In the past, ventilated cigarettes have been made utilising needle devices the efficiency of which has become ever reduced with the increase in productive capacity of cigarette making machines. In fact, if associated with relatively high speed machines, the said needle devices wear out in a relatively short time requiring frequent interruptions in the productive cycle.

For the reasons explained above the said needle devices have recently been replaced, when possible by laser ray perforator devices which have been made according to one of two different constructional arrangements. In the first of the two above mentioned known constructional arrangements a beam of pulsed laser rays is emitted by a fixed laser generator and directed onto a cigarette to be pierced. This latter, during the piercing operation, is made to rotate about itself in such a way that the holes formed on it are distributed in a substantially uniform manner along at least one circumference.

In the other of the two above mentioned known constructional arrangements a high power laser generator is utilised which, for piercing each cigarette, emits a single beam of rays which are broken down by fixed reflectors into a plurality of beams equal in number to the number of holes to be made. In this case the holes in each cigarette are made simultaneously without it being necessary to make the cigarette turn about its axis.

Both of the above described known constructional arrangements have significant disadvantages which make them difficult to put into practice. In fact, the first said constructional arrangement necessarily requires that each cigarette is rolled between two facing surfaces in such a way as to turn about its axis. Since the cigarette has immediately previously already been "softened" following a first rolling performed during the operations for connecting a filter, a further rolling for performing the piercing is particularly damaging in that it certainly involves a partial emptying of the cigarette. The second of the two above described constructional arrangements is on the other hand difficult to put into practice for purely economic reasons given the high power and, therefore, the high cost of the laser generator which must be used.

SUMMARY OF THE INVENTION

The object of the present invention is that of providing a method, utilising laser techniques, for obtaining perforations in bar-shape articles, in particular cigarettes, which will be free from the above described disadvantages.

The said object is achieved by the present invention in that it relates to a method for forming perforations in bar-shape articles, in particular cigarettes, characterised by the fact that it includes the following steps:

moving an article to be pierced along a determined path by means of a conveyor extending through a piercing station;

projecting onto the said article, by means of a plurality of laser emitters, beams of focused laser rays emitted in a predetermined sequence and with a determined focal length during a piercing time at most equal to the time taken by the article to traverse the said station;

the piercing station including a support element for the said emitters, and these latter being distributed over the said support along a curve the shape of which is such as to maintain the length of a respective path followed by each beam of laser rays between a focusing point and an associated piercing point on the said article constantly equal to the said focusing length.

According to the present invention there is further provided a device for forming perforations in bar-shaped articles, in particular cigarettes, characterised by the fact that it includes a piercing station for the said articles and a conveyor for causing the said articles to be pierced to move in succession through the said piercing station; this latter including a plurality of laser emitters operable to emit in a predetermined sequence beams of focused laser rays with a determined focusing length, and a support element for the said emitters; these latter being distributed on the said support along a curve the shape of which is such as to maintain the length of a respective path followed by each beam of laser rays between a focusing point and an associated piercing point on the said article constantly equal to the said focusing length.

BRIEF DESCRIPTION OF THE DRAWINGS

Further characteristics and advantages of the present invention will become apparent from the following description with reference to the attached drawings, which illustrate several non limitative embodiments thereof, in which.

DETAILED DESCRIPTION OF THE INVENTION

Figure 1:
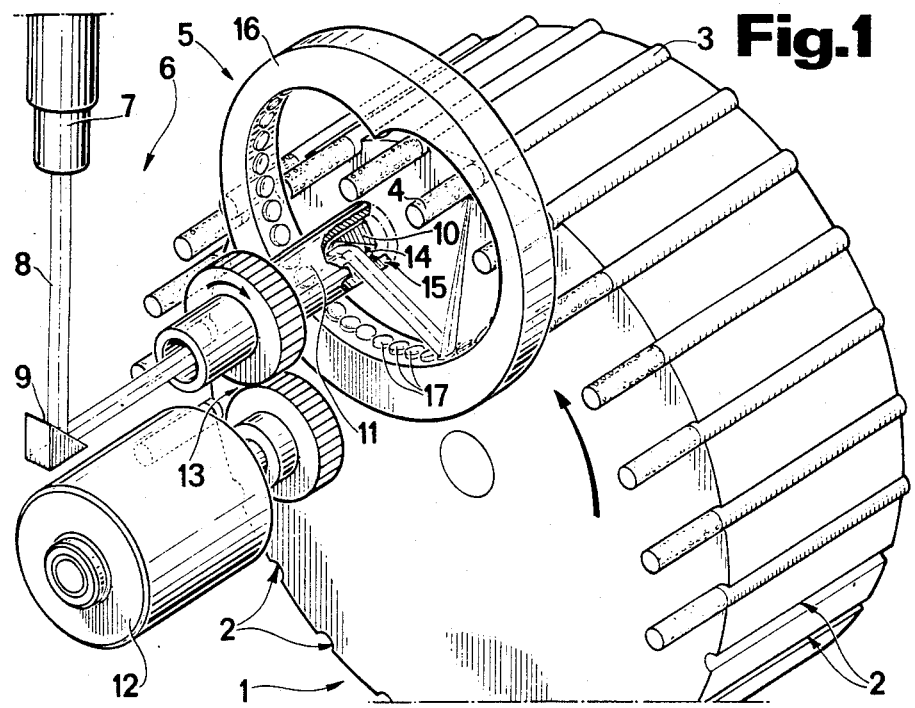
FIG. 1 is a schematic and perspective illustration of a first embodiment of the present invention.

In FIG. 1 there is illustrated a conveyor drum 1 rotatably mounted about its axis on a support not illustrated and having externally a plurality of seats 2. Each of these latter retains within it, by suction means not illustrated, a cigarette 3 having a filter 4 projecting cantilever fashion out from the associated seat 2.

During the advancement of the drum 1 each cigarette 3 traverses a piercing station 5 at which there are formed a series of perforations not illustrated on the filter 4, the diameter of which perforations is of the order of several hundreths of a millimeter.

The above mentioned perforations are formed by means of a perforator device 6 including a laser ray generator 7 which can direct a laser beam 8 onto a reflector element 9 which reflects the beam 8 onto a further reflector element 10 supported by a rotatable element 11. In the illustrated embodiment this latter is constituted by a tubular element rotatably mounted about its axis on a support not illustrated, which is rotated, with a determined law of motion, by a drive device 12 by means of a drive transmission train 13. The reflector element 10 has an inclined reflecting surface 14 facing a slit 15 in the tubular element 11 and arranged in such a way as to be maintained tangential during the rotation of the tubular element 11 with a conical surface (not illustrated) the axis of which coincides with that of the tubular element 11 itself and the section of the beam 8 lying between the reflecting elements 9 and 10.

The reflecting element 10 operates to direct the incident beam 8 into the piercing station 5, which includes an annular support 16 for a plurality of reflectors 17 distributed according to a predetermined law along an inner surface of the support 16. This latter is disposed in the space lying between the reflecting element 10 and the free ends of the filters 4, and extends entirely around the axis of the tubular element 11.

In the embodiment illustrated in FIG. 1 the beam 8 reaches the reflectors 17 without being subjected along its path upstream of the reflectors 17 to any focusing. This latter is effected by the reflectors 17, which for this purpose are each constituted by a concave mirror.

Figure 2:
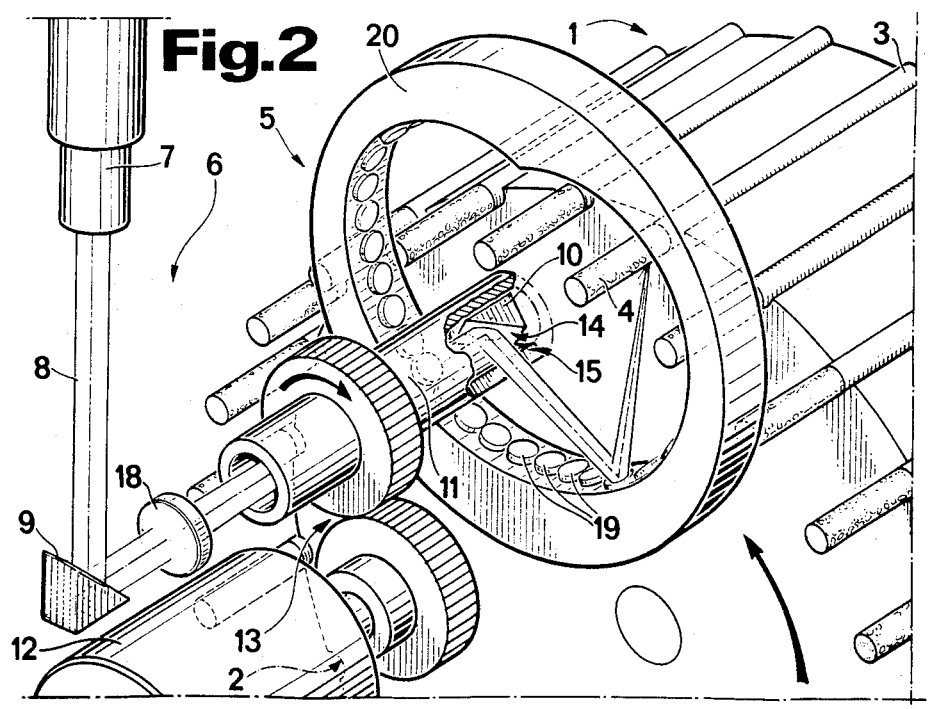
FIG. 2 is a schematic and perspective illustration of a variant of the embodiment of FIG. 1.

In the variant illustrated in FIG. 2 the beam 8 is focused upstream of the reflectors 17 by means of a converging lens 18 disposed between the reflector elements 9 and 10 with its focal axis coincident with the axis of the tubular element 11. Consequently, in the variant of FIG. 2, the concave reflectors 17 of FIG. 1 can be replaced with reflectors 19 constituted by plane mirrors mounted on a support 20 the form of which differs from that of the support 16 for reasons which will be explained below.

The operation of the perforator device 6 of FIG. 1 will now be described with reference to the diagram of FIG. 3.

As illustrated in FIG. 1, the conveyor 1 moves in an anti-clockwise sense in such a way as to convey the cigarettes 3 through the station 5 with a determined constant velocity. As illustrated in FIG. 3, each cigarette 3, during the traverse through the piercing station 5, follows a piercing arc the start of which, in the sense of advancement of the cigarette 3, is indicated 21 and the end of which is indicated 22 on a curve 23 followed by the centres of the cigarettes 3. During the time for which each cigarette 3 follows the arc 21-22 the length of which is, in the specific case of the illustrated example, equal to the spacing between the axes of two adjacent grooves 2 measured along the circumference of the drum 1, the generator 7 emits a pulsed series of beams 8 of laser rays, each of which is reflected from the rotating reflector element 10 onto successive reflectors 17 the centres of which are indicated in FIG. 3 with the points 24 distributed along a curve 25 of the so-called "cardioid" type. The successive beams 8 are directed from the corresponding successive reflectors 17 onto successive points 26 distributed along the piercing arc 21-22 and occupied in succession, during the formation of each hole in the filter 4, by the axis of the said cigarette 3.

The curve 25 is formed in such a way that the distance 'L' between each reflector 17 and each point 26, which can be assumed as coincident with a respective piercing point on the filter 4, is constantly equal to the focusing length of the beam 8 since, in the case in question, each reflector 17 also serves as a focusing element.

Figure 3:
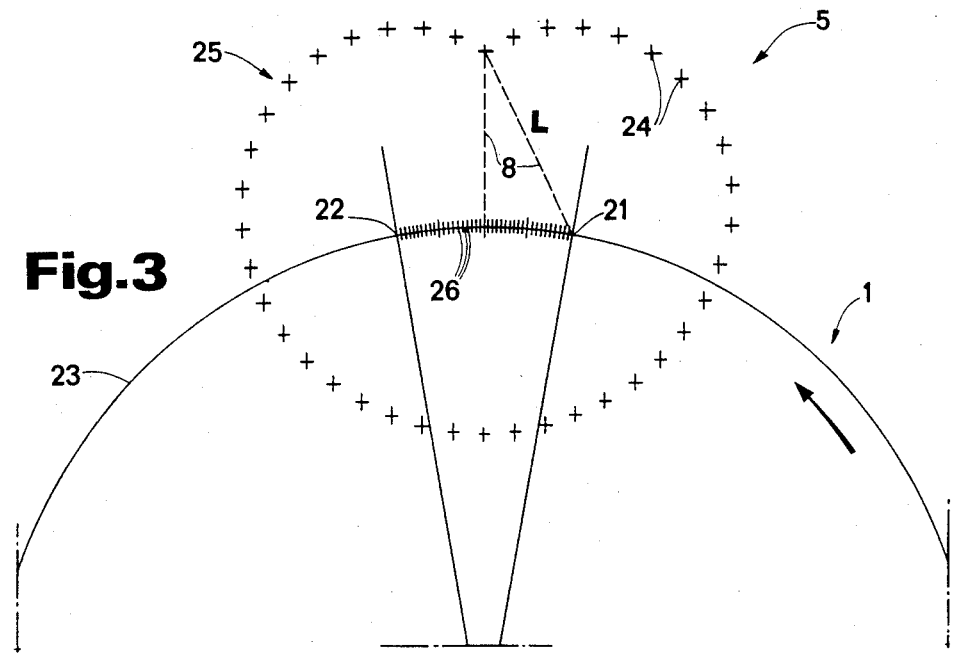
FIG. 3 is a structural diagram relating to the embodiment of FIG. 1.

Obviously, the distance 'L' which appears in FIG. 3 and the curve 25 are not the actual values but rather the projections of these onto a plane perpendicular to the axis of the drum 1. The curve 25 can have a different form from that illustrated in FIG. 3, which relates to the case in which the drum 1 and the reflector element 10 turn in opposite senses. In every case, the curve 25 will always have to be formed in such a way that the distance between each piercing point and the associated focusing element, measured along the axis of the beam 8, will be constant and equal to the focusing length.

On the basis of what has been described above it is possible to understand how the supports 16 and 20 are different from one another. In fact, whilst the form of the support 16 must be such as to maintain constant the difference between each focusing reflector 17 and the position occupied, at the instant of emission of the associated beam 8, by the associated piercing point, the form of the support 10 must be such as to maintain constant the sum of two distances, the first of which is the distance covered by the beam 8 between the reflector element 10 and each reflector 19, and the second of which is the distance covered by the beam 8 between each reflector 19 and the position occupied, at the insant of emission of the beam 8 itself, by the associated piercing point.

In a variant not illustrated, the reflector element 10 of FIGS. 1 and 2 is replaced with a triangular prism, or else with a prism of pyramid form having 'n' faces, in such a way that the beam 8 emitted by the generator 7 is broken up into two or 'n' beams. Obviously, in this case, given that the power of the generator 7 is sufficient, it will be possible to form at the same instant two or 'n' holes which, depending on the arrangement of the reflectors, can be formed on the same cigarette moving within the piercing station 5 or else on several cigarettes moving through the piercing station 5.

In another variant not illustrated, the embodiments of FIGS. 1 and 2 are modified in such a way as to provide not one but two rings of holes arranged at a predetermined distance from one another. A similar result can be obtained starting from the embodiments of FIGS. 1 and 2 by arranging on the support 16 or 20 two rows of reflectors provided with associated rotary reflector elements 10 operable to receive respective beams 8 from respective generators 7 or else from a single generator the output beam from which is divided into two by means of any known technique.

The above described non illustrated variants can be advantageously employed when it is desired to form the piercing of a so-called "double cigarette", that is to say an assembly constituted by two partly formed cigarettes coaxial with one another and joined at the head by means of a double filter which will have subsequently to be separated into two to obtain individual filter cigarettes.

In the above described case, and making for example reference to the embodiment of FIG. 1, one would have two drums 1 joined together, which would support a respective end of the said double cigarettes disposed at a distance from one another at least equal to the length of two filters 4. In this space an annular fixed support is mounted, similar to the support 16 but provided with reflectors 17 distributed around two rings and operable to receive a respective beam of rays reflected from a respective rotary reflector element 10.

The above described non illustrated variants can be provided with a single generator 7 the beam 8 from which can penetrate between the said two drums 1, for example along a central hole of a tubular axis of one of the drums 1 itself and, after having been separated into two equal beams in a known way, for example utilising partially reflecting mirrors, reaches the reflector elements 10.

Obviously, in the above described non illustrated variants, the annular support for double rings of reflectors must be separated, by two substantially diametral cuts, into two half rings disposed one between the drums 1 and the other radially outwardly of these for permitting the passage of the said double cigarettes through the piercing station 5.

Figure 4:
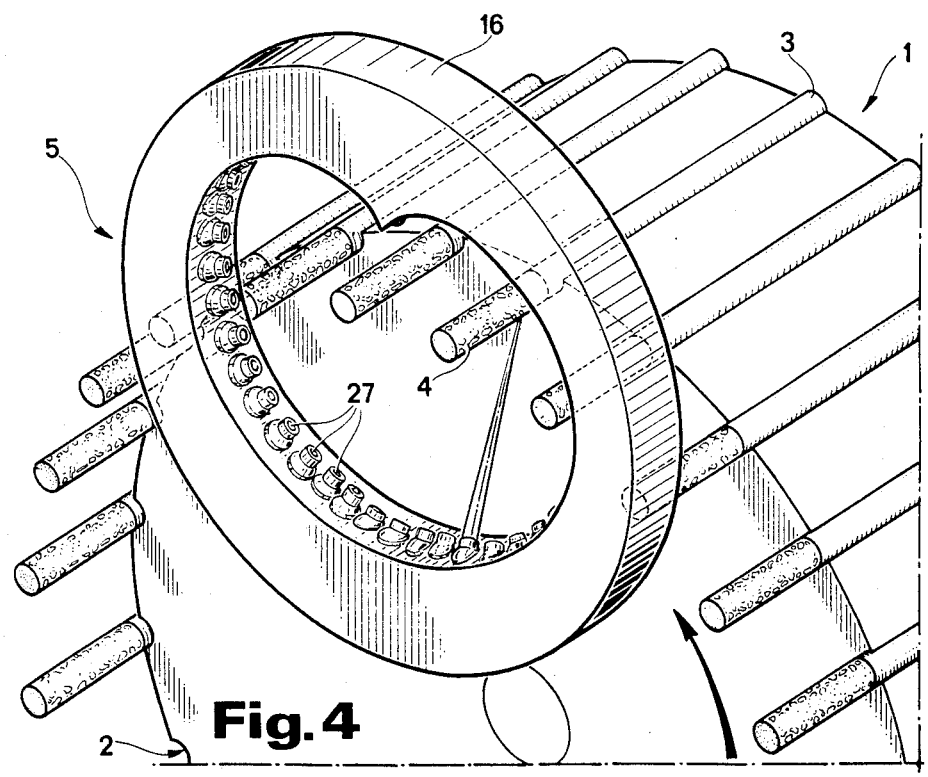
FIG. 4 is a schematic and perspective illustration of a further embodiment of the present invention.

The variant illustrated in FIG. 4 is conceptually similar to the embodiment of FIG. 1, from which it differs by the fact that it does nt have the generator 7 and the reflector elements 9 (fixed) and 10 (rotary) and has, in place of the focusing reflectors 17, laser diodes 27 supplied in a predetermined sequence and operable each to emit a focused beam of laser rays so as to obtain a respective hole in the filter 4 of each cigarette 3.

The operation of the variant of FIG. 4 will not be described since it will be immediately derivable from the operation of the embodiment of FIG. 1 described with reference to FIG. 3.

We claim:

1. A method for perforating bar-shaped articles, including the steps of:
    (a) directing a laser beam onto a rotary reflector,
    (b) deflecting said beam so as to make it impinge in succession onto each one of a plurality of stationary reflectors distributed along an annular support,
    (c) arranging each said stationary reflector so as to reflect an impinging laser beam onto a respective focusing point along a respective point of a line segment, and
    (d) advancing by means of a conveyer the articles to be pierced in succesion along a path, a portion of which coincides with said line segment.

2. The method as said forth in claim 1, including the steps of:
    (a) rotating the rotary reflector at a speed such that it performs a complete revolution about an axis of said laser beam during the time taken by each said article to traverse said path portion.

3. The method as set forth in claim 2, including the step of:
    (a) arranging the line segment so that it is equal in length to the distance between two adjacent articles on said conveyer.

4. The method as set forth in claim 1, including the step of:
    (a) focusing the laser beam by means of a focusing lens arranged upstream from said rotary reflector and stationary reflectors each being a plane mirror.

5. The method as set forth in claim 1, including the step of:
    (a) focusing said laser beam through a plurality of concave stationary focusing mirrors.

6. A device for forming perforations in bar-shaped articles, in particular cigarettes, comprising:
    (a) a piercing station for articles and a conveyer for causing the articles to be pierced to move in succession through the piercing station, the piercing station including a plurality of laser emitters each successively operable to emit beams of focused laser rays with a predetermined focusing length, and a support element for the emitters which are distributed thereon along at least one curve formed in such a way as to maintain the length of a path followed by each beam of laser rays between the emitter and the associated piercing point on the article to be pierced maintained constantly equal to the focusing length, the laser emitters being reflector elements selectively impinged on by a beam of laser rays emitted by a rotary reflector laser generator operable to successively deflect the beam onto each reflector element fixed on the support to reflect the beam on the articles to be pierced.

7. A device according to claim 6, wherein each said reflector element has a concave focusing mirror surface.

8. The device as set forth in claim 6, wherein:
    (a) each reflector element is a plane mirror and focusing means is provided upstream of the plane mirrors for focusing successive means of laser rays.

* * * * *